United States Patent [19]

Aleck

[11] 4,265,467
[45] May 5, 1981

[54] FRICTIONAL SUSPENSION DAMPING SYSTEM

[75] Inventor: Benjamin J. Aleck, Jackson Heights, N.Y.

[73] Assignee: Grumman Aerospace Corporation, Bethpage, N.Y.

[21] Appl. No.: 26,932

[22] Filed: Apr. 4, 1979

[51] Int. Cl.³ .............................................. B60G 11/18
[52] U.S. Cl. ................................... 280/721; 188/1 B; 188/75
[58] Field of Search ................... 188/2 A, 75, 1 B, 67; 280/689, 700, 721

[56] References Cited

U.S. PATENT DOCUMENTS

| | | | |
|---|---|---|---|
| 3,124,368 | 3/1964 | Corley et al. | 280/6 |
| 3,490,786 | 1/1970 | Ravenel | 280/721 |
| 3,502,347 | 3/1970 | Busignies | 280/124 |
| 3,603,612 | 9/1971 | Hill et al. | 280/124 F |
| 3,805,034 | 4/1974 | Klein et al. | 235/150.24 |
| 3,893,695 | 7/1975 | Rickert | 303/20 X |
| 3,986,586 | 10/1976 | Mauger et al. | 188/75 X |
| 3,995,883 | 12/1976 | Glaze | 280/707 |

Primary Examiner—Douglas C. Butler
Attorney, Agent, or Firm—Richard G. Geib; Bruce B. Brunda

[57] ABSTRACT

A frictional suspension damping system is provided whereby vehicular oscillations due to an uneven terrain may be controlled by electrically regulated frictional braking device adapted to restrain the rotational movement of a remote torsion bar. Each wheel having an associated torsional member may be so damped. A centralized processor may be used for simultaneous control of a plurality of friction brakes.

19 Claims, 15 Drawing Figures

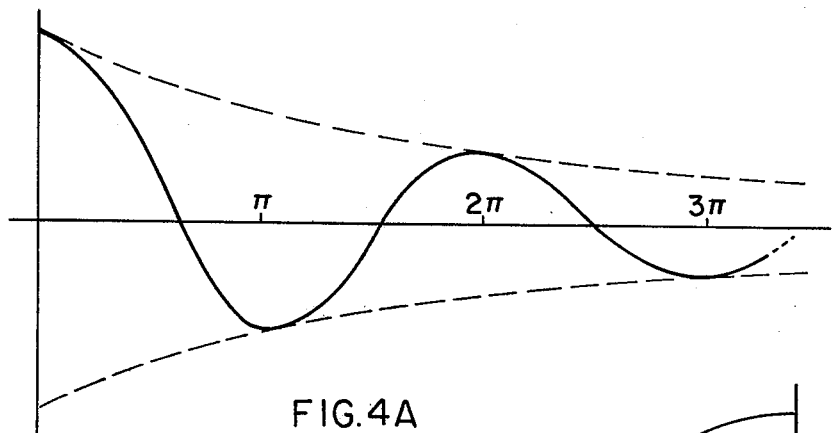
FIG.4A
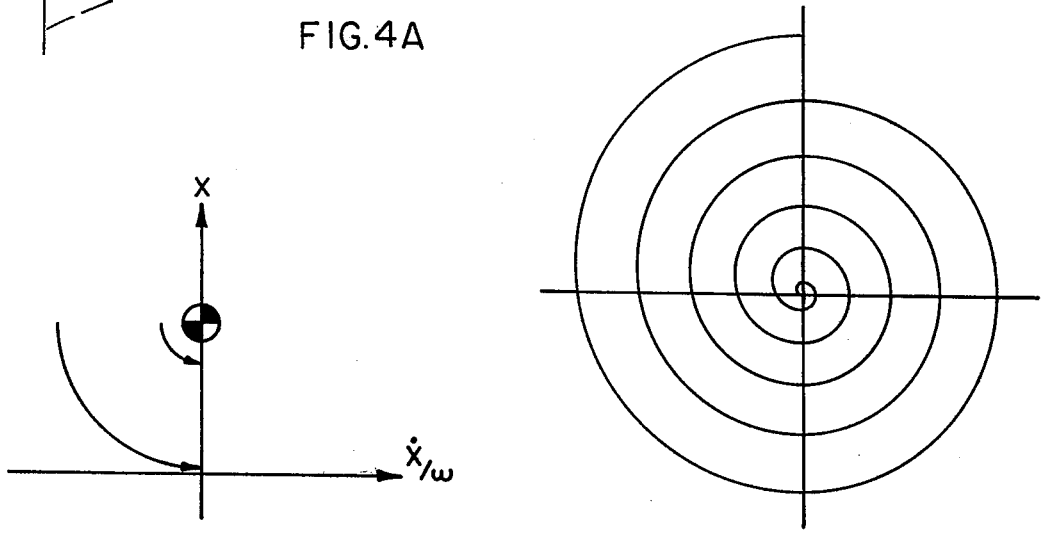
FIG.5
FIG.4B
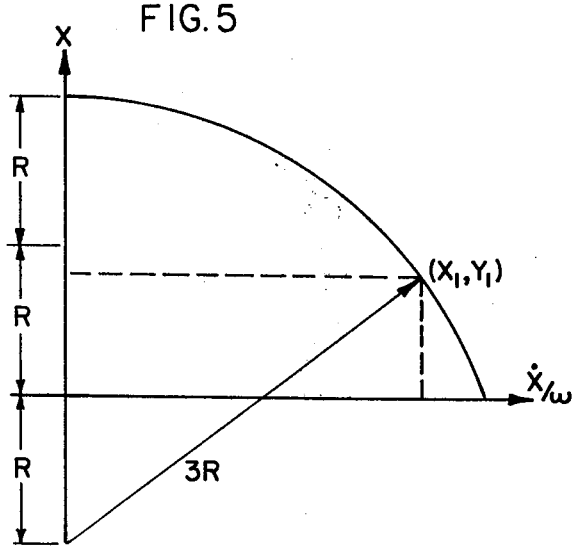
FIG.6
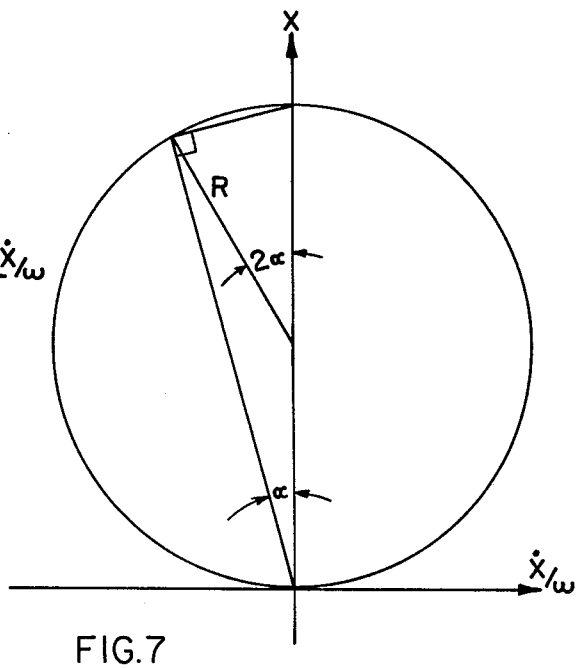
FIG.7

FRICTIONAL SUSPENSION DAMPING SYSTEM

BACKGROUND OF THE INVENTION

In the past, vehicular damping systems have included springs, viscous dampers and torsion bar systems. The particular design parameters will be selected to suit the application requirements as defined by the systems' characteristic equations of motion.

Spring systems, for example, function to restore the system to its undisturbed position. Since they are elastic, they absorb and return energy without dissipating any.

By comparison, the energy input to viscous dampers is dissipated as heat which is lost to the environment and not returned as kinetic energy. Hence, the frictional dampers act to reduce the amplitude of chassis motion with time.

Torsion bars display mechanical characteristics similar to springs and, therefore, present similar problems in terms of defining an optimum construction for all displacements. Comparatively soft springs fail to absorb the more severe suspension shocks because their travel becomes excessive, yet they will effectively dampen high frequency vibrations. On the other hand, comparatively stiff springs do little to dampen high frequency, low amplitude oscillations, while effectively reducing the travel for severe shocks.

Typical viscous damping systems include a tight fitting displacement piston having an internal orifice and positioned within a liquid filled cylinder. Some net pressure is required in order to pass fluid through the internal orifice. This pressure, acting on the piston, tends to slow the axial motion of the piston within the cylinder. The faster the plunger is displaced, the larger the restraining force acting upon it, conversely, a slower motion will encounter substantially less resistance. Since inertia keeps a body from developing a velocity quickly, the main viscous restraining effect will be delayed until the higher velocities are achieved. More elaborate systems of this type include built-in corrective mechanisms which anticipate this delayed effect.

Another open cycle (no servo control) system of a more sophisticated design can be found within an aircraft's landing gear oleo strut system. Here the orifice size is made a function of the piston stroke. A tapered pin passes through the orifice as the gear is compressed. Through this construction, the frictional restraining force is caused to depend in a fixed manner, upon the instantaneous combination of velocity and displacement. Modifications of this type suspension system have included the incorporation of computer controlled servo devices which vary the orifice size in response to computer signals. Better anticipation and hence comfort should be possible with this "closed loop" type of system.

Viscous dampers also incur difficulties due to their typical bulk and location. To provide the most effective suspension control, a hydraulic cylinder is interposed between a vehicle frame and each wheel. In many applications, such construction is inordinately space consuming and difficult to maintain.

By way of illustration, one problem encountered in armored military vehicles, concerns cooling the viscous damper. As hydraulic fluid repeatedly flows through the orifice, it becomes warmer, whereupon its resistance to flow will diminish, hence its damping characteristics are caused to change. The small surface to volume relationship, size and location of the cylinder and associated devices make convective cooling difficult.

Accordingly, it is, therefore, a major object of this invention to provide a relatively light weight frictional damping system adapted for use with a vehicular suspension system.

It is a further object of this invention to provide a versatile vehicular suspension damping system which is capable of centralized electronic control of a plurality of individual dampers, each associated with an individual wheel.

It is yet another object of the present invention to provide a simple, inexpensive and reliable system for damping vehicular oscillations due to terrain irregularities.

SUMMARY OF THE INVENTION

These and other objects of the present invention are accomplished by providing a frictional suspension damping system adapted to brake the rotational movement of an elastic torsion bar member as it twists in response to terrain variations. The load normal to the rubbing surfaces of the frictional braking device is related to the desired torsional resistance and may be controlled by a lightweight, centralized processor. Electrical signals from transducer units are used to provide measurable indications of terrain aberrations. The desired degree of frictional braking is related to the measured displacements as well as derivatives thereof. In addition, the whole vehicle may be used as a radiator to dissipate the heat generated by friction.

BRIEF DESCRIPTION OF THE DRAWINGS

FIGS. 4A and 4B illustrate the motion of a system having less than critical damping.

FIGS. 5, 8, 9, 10, 11 and 12 illustrate the motion of the system from various initial locations, as the system is brought to rest in accordance with the present inventive technique.

FIGS. 6 and 7 illustrate exemplary analytical techniques used to determine the magnitude of the applied force.

DETAILED DESCRIPTION OF THE DRAWINGS

Figure 1:
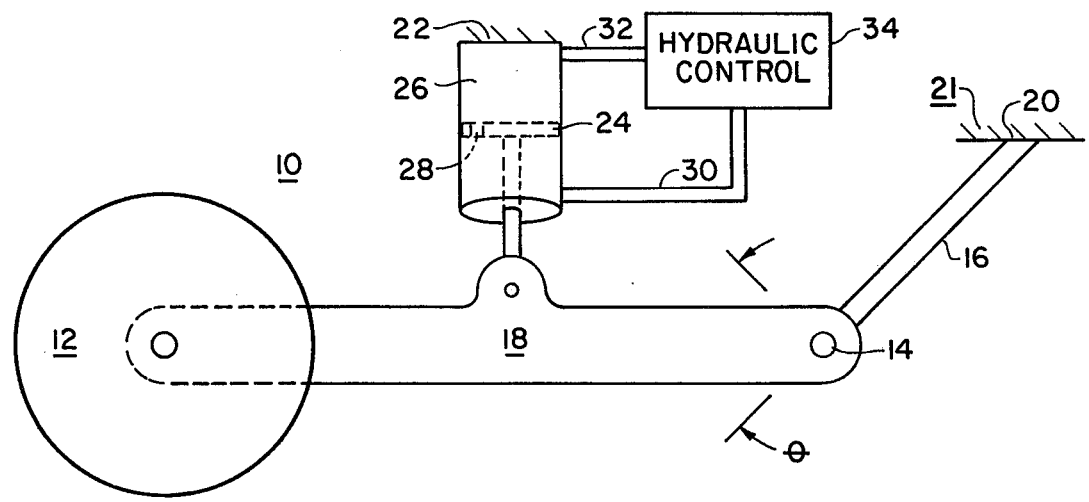
FIG. 1 is an illustration of a typical hydraulic damping device connected to a vehicle wheel.

FIG. 1 illustrates a viscous suspension system which would typically be used on armored military vehicles. Each wheel 12 of the vehicle 10 is mechanically coupled to an individual elastic torsion bar 16 via pivot 14 and connecting member 18. The vehicle chassis 21 is supported by the suspension system through torsion bar attachment 20 and through hydraulic housing connector 22. Piston 24 is adapted to traverse fluid filled cylinder 26 and is secured at its lower end to connecting member 18.

Each wheel of the vehicle is capable of moving up or down in response to terrain variations. As connecting member 18 consequently traverses some angle $\theta$ about the axis of pivot 14, a proportional mechanical displacement representing this movement is translated to a hydraulic output from cylinder 26. The velocity of this mechanical displacement is related to the pressure levels within the cylinder and to the fluid flow rate through orifice 28 according to the equations of motion of the system. Conduits 30 and 32 communicate fluid pressure levels between internal segments of cylinder 26 and a remote hydraulic control device 34. This device may include automatic means for regulating cylinder internal pressure levels in order to optimize suspension damping. Alternatively, the size of orifice 28 may be varied in order to achieve the same regulation.

Figure 2:
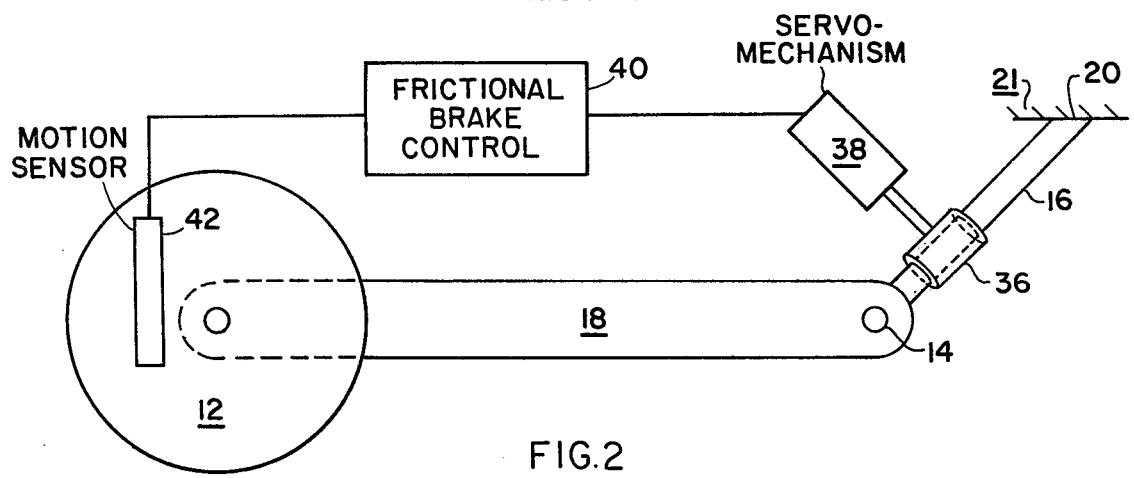
FIG. 2 is an illustration of one embodiment of the present invention showing frictional braking of a rotating torsion bar.

FIG. 2 illustrates one embodiment of the present invention wherein suspension damping is achieved with improved control and efficiency, and in a simple and more reliable manner. In the absence of any applied frictional force, the twisting of torsion bar 16 about its longitudinal axis is opposed only by the stiffness of the bar between the twisted end, connected to wheel 12, and the stationary end fixed to the chasis at attachment 20. According to the invention, the vertical movement of wheel 12 is damped by frictionally opposing the rotational displacement of the end of torsion bar 16 through the use of frictional braking means 36, activated by servo-mechanism 38.

Braking means 36 may be of the standard drum variety or of any conventional design adapted to apply variable resistance to the rotational twist of torsion bar 16. Servo-mechanism 38 may also be of any compatible design which can translate an electrical signal from frictional brake control processor 40 into a mechanical motion forcing braking means 36 into friction contact with torsion bar 16. Servo 38 may, for example, be regulated in terms of the pressure or torque to be applied to the torsion bar.

Motion sensor 42 may be secured to either the vehicular chassis or the wheel and is designed to indicate the relative motion between the two. The function of the sensor is to translate the degree of vertical wheel movement into an electrical signal which can be effectively communicated to processor 40.

Figure 3:
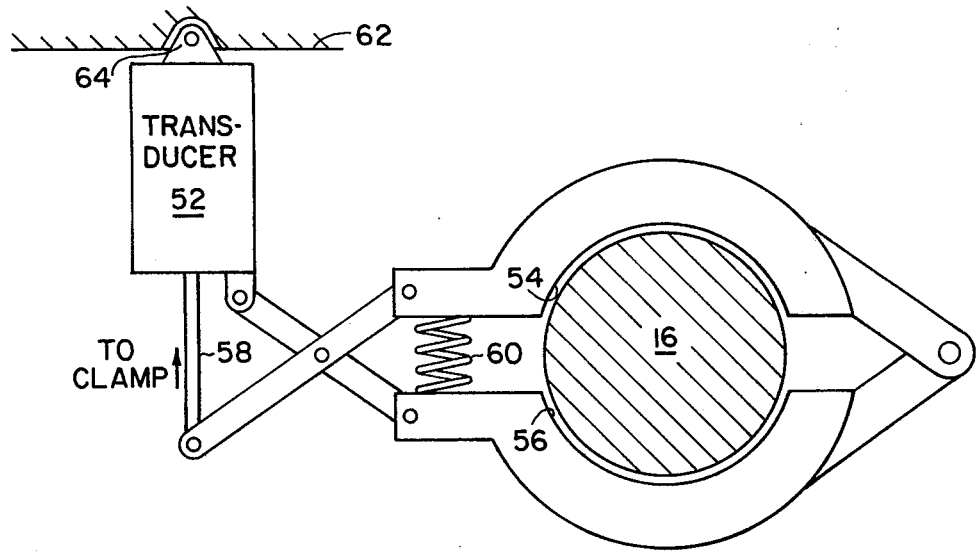
FIG. 3 illustrates an exemplary braking means provided to control the pressure applied to the surface of the torsion bar.

FIG. 3 illustrates one exemplary construction of braking means which may be used to control the rotational twist of the vehicular torsion bar 16. As a control signal is received by transducer 52, shaft 58 is extended or retracted in response to the command. As the shaft is retracted, surfaces 54 and 56 are caused to move in opposition to the spring 60 as to frictionally contact the surface of bar 16. Transducer 52 is secured to the chassis 62 by mounting means 64. As shaft 58 is again extended, the pressure on bar 16 is accordingly decreased.

As will be apparent to one skilled in the art, various types of frictional braking means may be employed in connection with the present technique.

It is, of course, possible to regulate the degree of suspension damping through the mechanical operation of a foot pedal controlled by a passenger in the vehicle instead. In this scenario frictional brake control 40 would be provided by foot pressure against the braking pedal. Accordingly, the twisting motion of torsion bar 16 may be regulated by the operator as he travels in the vehicle. The up and down motion of the suspension could thereby be controlled by the relative brake pedal pressure.

In view of the rapid transients and the desirability of relieving the passenger from additional duties, some form of automatic control using electronic processing techniques would provide faster and more desirable braking control at moderate cost.

If a constant force, P, is applied to the system, the steady state condition of the undamped system becomes altered by an amount, $$X_s = P/K$$

Where the system is damped, a constant force may be selectively applied to bring the motion to rest without bounce, and in a shorter period than if viscous damping were used. Unlike viscous dampers which respond more slowly to an impulse, the present technique allows the application of full force even at a small velocity. Frictional force, applied to restrain the motion of a vehicular torsion bar, will oppose the motion of the system in any direction. Information provided from system sensors can be used to regulate the applied force based upon continual or periodic signals. The rate of signal sampling may be a function of the natural frequency and other characteristics and requirements of the particular system.

The physical motion of the suspension system can be represented by the terms of a linear differential equation with constant coefficients, the order of the equation being higher than the first. The differential equation of a damped system is often of the form, $$M(d^2x/dt^2) + F(dx/dt) + Kx = f(t)$$

where M, F and K are positive constants of the system; x is the dependent variable of the system (displacement) and f(t) is the applied force. The coefficient F, of the first derivative is commonly referred to as the damping coefficient. w, the natural frequency of the system, is measured by, $$w^2 = K/M$$

A system is considered critically damped when the damped system returns to rest as quickly as possible after an abrupt stimulus without overshoot. A damped harmonic system is termed critically damped if $F^2 = 4MK$.

If overshoot occurs, the system is considered underdamped. Overdamping occurs when the system has no overshoot, but returns to rest more slowly than if critically damped. Currently available hydraulic systems are underdamped, and, therefore, the free oscillations change signs at least once. The vehicle, therefore, bounces resulting in an uneven ride which may be too discomforting to passengers. FIG. 4A illustrates the free vibration of a system with less than critical damping. A vector diagram also portraying the free vibration of an underdamped system is shown in FIG. 4B. Damping of the system serves to decrease the amplitude of the waveform in FIG. 4A and is analogous to the decreasing radius in FIG. 4B. The revolving vector shrinks at a rate proportional to its length, giving a geometric series diminution. The endpoint of this vector describes a logarithmic spiral. The response of an undamped, lossless system resembles a circle, while the damped system, as in FIG. 4B, spirals to a rest condition. Here the rest condition ($X_s$) is zero.

In FIG. 5, the graphical results of the use of the present technique are illustrated for one scenario. Here the initial conditions are assumed as $X=1$ and $\dot{X}/w=-1$. With the application of a constant force, P, the system is brought to rest, without crossover, in ¼ period. As may be apparent, the goal of the present technique is to bring the system to rest as quickly as possible from any arbitrary initial conditions. Typically, transient motion can be brought to rest in ¼ to ¾ period. The degree of frictional force exerted may be made a function of the displacement, velocity or acceleration of the system's motion.

FIG. 7 illustrates the general case for initial conditions in the second and fourth quadrants. Since the magnitude of the distance from R sin 2 α can be defined as, $$R \sin 2\alpha = |X_1|$$

it follows that α can be measured by, $$\alpha = \tan^{-1}(-X_1/Y_1),$$

where $X_1$ and $Y_1$ are the coordinates of an arbitrary initial condition.

Since $$\cos \alpha = \frac{Y_1}{\sqrt{X_1^2 + Y_1^2}} = \frac{\sqrt{X_1^2 + Y_1^2}}{2R},$$

the value of R, which determines the applied force, can, therefore, be shown to equal, $$R = (X_1^2 + Y_1^2)/2Y_1$$

FIG. 6 illustrates the general solution for cases where the initial conditions occur in the first or third quadrants. For convenience, the magnitude of the swing arm is defined as 3R. Therefore, using standard geometry, it can be seen that, $$(3R)^2 = (Y_1+R)^2 + X_1^2$$

wherefrom it follows that, $$R = Y_1/8 + \sqrt{\frac{X_1^2}{8} + \frac{9Y_1^2}{64}}$$

It should be noted that the illustrated relationships may be varied in order to provide a flatter or steeper response curve. The solutions presented above merely represent one exemplary approach to determining the magnitude of the pressure applied to the braking means about the torsion bar.

It has been discovered that unexpectedly favorable frequency response results using the present technique have been realized when the upstroke damping is increased to approximately four times the damping level used against the downward movement of the system. Further adaptations include the addition of a further damping function designed to simulate the effect of viscous damping. In this case, the force applied to bring the system to rest is varied during the course of the motion. By this simulation or other limiting techniques, the advantageous effects of viscous damping can be utilized without incurring the accompanying penalties of weight and heat dissipation. Of course, an actual viscous damping system may be employed, in which case the present technique would be adapted to augment and improve the response of the viscous system acting alone.

As will be apparent to one skilled in the art, numerous software control techniques may be devised to regulate the applied pressure to the torsion bar. The motion of the system may thereby be controlled on a periodic or continuous basis.

Figure 8:
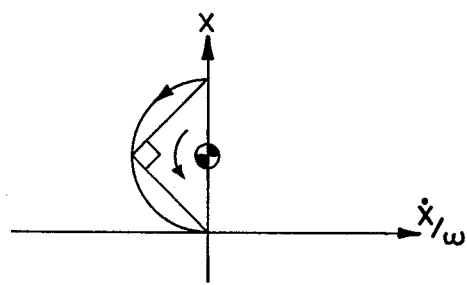

FIG. 8 illustrates the motion of the system when the initial conditions are $X=1$ and $\dot{X}/w=0$. With the application of a constant force equal to (½)K, the system is brought to rest in ½ period.

Figure 9:
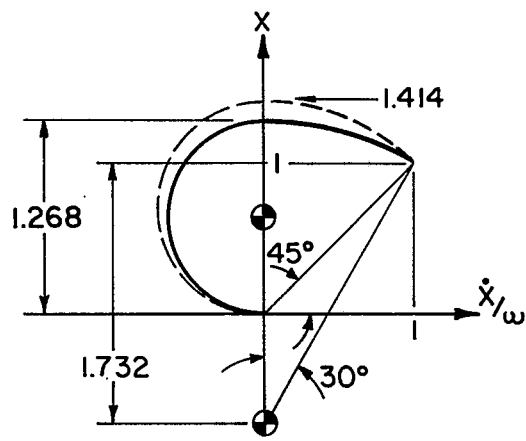

Initial conditions of $X=1$ and $\dot{X}/w=1$ are shown in FIG. 9. In this case, the simplest approach is to do nothing for ⅛ period and then create the situation of FIG. 8. In order to reduce the peak displacement of the system, a force, $P=K(-0.732)$ may be applied for 1/12 period to effect the FIG. 8 situation at $X=1.268$ instead of $X=1.414$. Upstroke damping, therefore, occurs until crossover of the X axis, then a positive force is applied as previously described.

Figure 10:
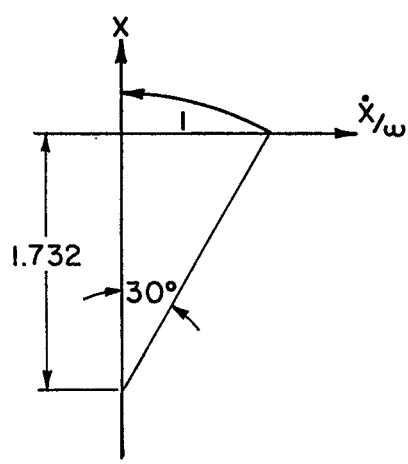

FIG. 10 illustrates the same techniques as FIG. 9 where the initial conditions are $X=0$, $\dot{X}/w=1$. A force of $P=K(-1.732)$ is applied for 1/12 period to again create the situation of FIG. 8.

Figure 11:
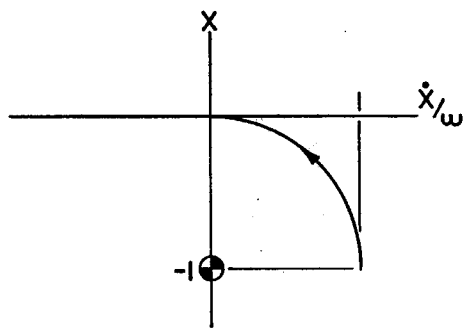
Figure 12:
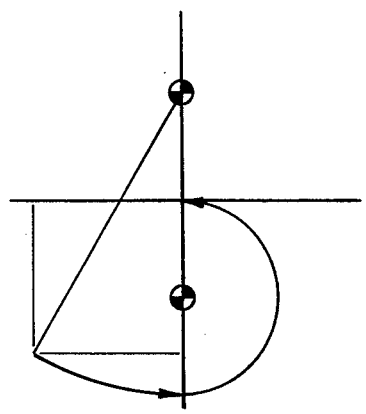

FIGS. 11 and 12 illustrate analogous constant damping force techniques responsive to different initial conditions.

Although illustrated in terms of constant forces, it is understood that in practice the present technique may be used in conjunction with an analog computer and sensors to provide a continuously variable force designed to bring the system to rest.

Figure 13:
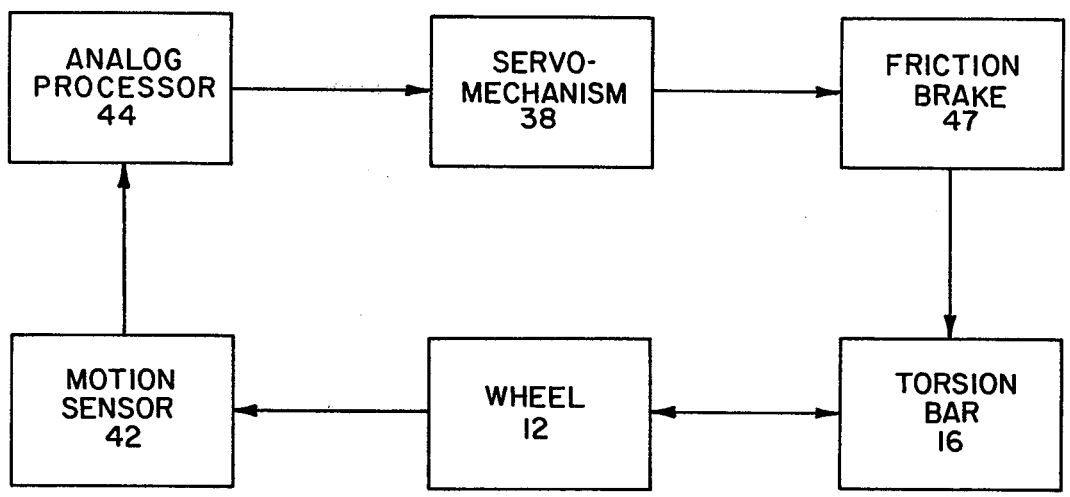
FIG. 13 is a representative block diagram of an exemplary system used to control the operation of the frictional brake as shown in FIG. 2.
Figure 14:
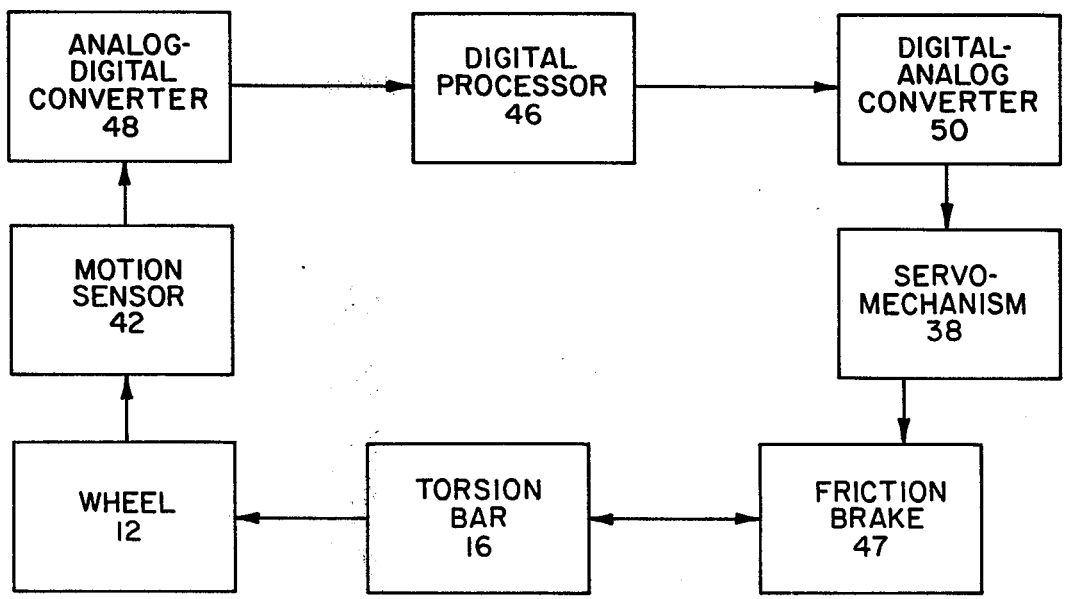
FIG. 14 is a representative block diagram of a second exemplary system which could also control a frictional braking system.

FIG. 13 illustrates an analog version of such a processor and FIG. 14 discloses a digital version of the system.

In FIG. 13, the motion of wheel 12 in response to an external forcing function is detected by motion sensor 42. The sensor may be of any numerous available devices which produce a measurable electric output representative of the physical movement of the wheel. The output of sensor 42 may be amplified, linearized or converted into a more useful form according to the processor requirements.

Electro-mechanical sensors may be an attractive option to their low cost. In some applications, however, they may be inappropriate due to their short life span and susceptibility to damage from vibration, fluid, dust and dirt.

Solid state sensors including proximity sensors, magnetic pick-ups, broken beam sensors and mechanically operated sensors may be preferable in that they are often easier to install or adjust, and may be more directly compatible with the processing system employed.

Analog processor 44 is adapted to receive the output signal from sensor 42 and operate on that signal in order to communicate a control signal to servo-mechanism 38. Frictional brake 47 is mechanically activated by the servo-mechanism so as to appropriately dampen the rotational movement of torsion bar 16 through frictional contact with the bar. The degree of damping desired is related to the movement of the wheel and the predetermined damping equations of processor 44.

As is also the case with the system described in FIG. 14, the greater the frictional torque exerted on torsion bar 16, the more energy absorbent the suspension becomes, providing the torsion bar is not completely inhibited from rotating.

The system shown in FIG. 14 differs from that of FIG. 13 in its use of digital processing means including digital processor device 46 and converters 48 and 50.

While either analog or digital processing techniques may be adequate, there are advantages to both. Digital systems have the advantage of being readily available in durable, low cost units. In addition, they do not require bulky and expensive specially wound potentiometers or multipliers.

On the other hand, analog systems have the advantage of being more compatible with motion sensors and other transducers necessary to provide mechanical control. These mechanical devices are typically adapted to receive or transmit low-level, analog type signals and would, therefore, require the use of digital/analog converters to be compatible with digital processors.

Having described several types of transducers and processors, it should be apparent that the particular type of electrical and mechanical controls used to regulate the frictional damping system of the present invention is a function of the particular application. Moreover, these and other operative variations which may be apparent to one skilled in the art may be made without departing from the spirit and scope of the present invention, which is meant to be limited only by the appended claims which follow.

What is claimed is:

1. A system to vary the energy absorbing characteristics of a torsion bar system, said means comprising:
   suspension apparatus for supporting a platform upon a moveable member, said apparatus including a torsion bar fixed at a first end to said platform, and a connecting member coupling a second end of said torsion bar to a moveable member;
   frictional braking means operatively connected to said torsion bar; and
   motion sensor apparatus operably connected to said moveable member and further connected to said braking so as to vary the application of frictional restraint to the surface of said torsion bar in accordance with movement of said moveable member.

2. The system as recited in claim 1 wherein said braking means comprises a drum type brake device interposed about said torsion bar and adapted to regulate the rotational twist of said bar through variable frictional contact therewith.

3. The system as recited in claim 1 wherein said suspension apparatus comprises a moveable member compressibly coupled to said platform.

4. The system as recited in claim 3 wherein said torsion bar is secured at one end to said platform.

5. The system as recited in claim 1 wherein said suspension apparatus comprises a wheel and compliant supporting means to couple said wheel to a motor vehicle chassis.

6. The system as recited in claim 5 wherein one end of said torsion bar is secured to said motor vehicle chassis and rotatable at the opposite end.

7. The system as recited in claim 1 wherein said motion sensor apparatus comprises a motion sensing transducer adapted to translate the motion of said suspension means into a related electrical signal to control the torque applied by said braking means.

8. The system as recited in claim 7 wherein said sensor apparatus comprises an electro-mechanical analog transducer.

9. The system as recited in claim 7 wherein said sensor apparatus comprises an electro-optical analog transducer.

10. The system as recited in claim 7 wherein said motion sensor apparatus further comprises a signal-processing device adapted to receive said electrical signal from said transducer and to operate on said electrical signal as to generate a control signal.

11. The system as recited in claim 10 wherein said motion sensor further comprises servo-mechanism apparatus mechanically connected to said brake and adapted to receive said control signal from said signal processing device, said servo-mechanism apparatus being further adapted to thrust said brake into variable frictional contact with said torsion bar to an extent related to the amplitude of said control signal.

12. A suspension control system for actively damping dynamically sprung parts comprising:
   vehicle suspension apparatus including a torsion bar coupled to a vehicle wheel;
   motion sensor means responsive to the vertical movement of said wheel and adapted to produce an electrical sensor output signal responsive to said movement;
   signal processing means electrically connected to said sensor means and adapted to provide an electrical control signal related to said sensor output signal;
   servo-mechanism means for providing mechanical movement responsive to said control signal; and
   frictional braking means mechanically coupled to said servo-mechanism means and disposed about said torsion bar and adapted to provide variable bearing and frictional contact with the surface of said torsion bar.

13. The system as recited in claim 12 wherein said motion sensor comprises a mechanical transducer.

14. The system as recited in claim 12 wherein said motion sensor comprises an electro-mechanical analog transducer.

15. The system as recited in claim 12 wherein said processing means comprises an analog to digital converter coupled to said motion sensor, digital processing means adapted to perform predetermined operations on the output of said analog to digital converter; and, a digital to analog converter coupled to the output of said digital processing means.

16. The system as recited in claim 12 wherein said processing means comprise analog processing means adapted to perform predetermined operations on the output of said motion sensor.

17. The system as recited in claim 12 wherein said frictional braking means comprise conventional drum braking means which may be variably depressed against the surface of said torsion bar.

18. The system as recited in claim 12 wherein said frictional braking means further comprise brake linkage means for mechanically coupling said frictional braking means to said servo-mechanism means, and adapted to displace said braking means into contact with said torsion bars in response to the motion of said servo-mechanism means.

19. A suspension system for actively damping dynamically sprung parts, said system comprising:
   suspension apparatus for supporting a vehicle chassis upon a vertically displaceable wheel, said apparatus including a torsion bar fixed at a first end to said chassis, and a connecting member coupling a second end of said torsion bar to a wheel;

motion sensor means responsive to the vertical displacement of said wheel and adapted to produce an electrical sensor output signal responsive to said movement;

signal processing means electrically connected to said sensor means and adapted to provide an electrical control signal related to said sensor output signal;

servo-mechanism means for providing mechanical movement responsive to said control signal; and frictional braking means mechanically coupled to said servo-mechanism means and disposed about said torsion bar, said braking means being adapted to provide variable frictional contact with the surface of said torsion bar.

* * * * *